United States Patent [19]
Dayton et al.

[11] Patent Number: 4,574,318
[45] Date of Patent: Mar. 4, 1986

[54] LIGHT ARRANGEMENT FOR SCANNER-DIGITIZER

[75] Inventors: Douglas C. Dayton, Cambridge; Clifford E. LaCount, Townsend; Burton G. McConchie, Reading, all of Mass.

[73] Assignee: Wang Laboratories, Inc., Lowell, Mass.

[21] Appl. No.: 537,612

[22] Filed: Sep. 30, 1983

[51] Int. Cl.⁴ ............................................. H04N 1/04
[52] U.S. Cl. ................................... 358/285; 358/294; 355/68
[58] Field of Search .......................... 250/522.1, 578; 350/523, 524, 526, 507, 528, 514; 355/18, 21, 67, 68, 70, 71; 358/209, 230, 249, 293, 294, 285; 362/3, 7, 11, 18

[56] References Cited

U.S. PATENT DOCUMENTS

| | | | |
|---|---|---|---|
| 3,186,296 | 6/1965 | Erban | 350/528 |
| 3,649,120 | 3/1972 | Pfeifer et al. | 355/68 |
| 3,907,428 | 9/1975 | Norgaard et al. | 355/68 |
| 4,485,409 | 11/1984 | Schumacher | 358/294 |

FOREIGN PATENT DOCUMENTS

| | | |
|---|---|---|
| 7900124 | 8/1980 | France . |
| WO81/00944 | 4/1981 | PCT Int'l Appl. . |
| 479212 | 11/1969 | Switzerland . |
| 1319690 | 6/1973 | United Kingdom . |

*Primary Examiner*—Edward L. Coles, Sr.
*Attorney, Agent, or Firm*—Michael H. Shanahan; Kenneth L. Milik

[57] ABSTRACT

A video scanning arrangement for scanning and digitizing documents, and having a scanner actuable to scan a document on a tablet beneath the scanner. The scanner is attached to a horizontal arm member which is in turn attached to and movable up and down a vertical support member which in turn is attached to the tablet. Two light arms are pivotally attached to the horizontal arm member and each light arm has a light source attached to its nonpivoting end. Each light arm is normally folded against the horizontal arm member for storage when the video scanning arrangement is not in use, and the light arms are extended to move the light sources away from the arm member when the video scanning arrangement is to be used. The light sources are energized to illuminate a document on the tablet when the scanner is actuated to scan a document.

14 Claims, 2 Drawing Figures

FIG I

LIGHT ARRANGEMENT FOR SCANNER-DIGITIZER

FIELD OF THE INVENTION

This invention relates to video scanning equipment and facsimilie equipment, and more particularly to apparatus for illuminating documents to be scanned for digitization and/or transmission

BACKGROUND OF THE INVENTION

In the prior art, video scanning and facsimilie equipment typically utilize lighting arrangements to illuminate documents to be scanned for digitization and/or transmission. There are shortcomings in the prior art with such systems made up of scanning and lighting equipment. Typically, the lighting arrangements are separate from the scanning equipment and the combination of the lighting equipment and the scanning equipment are relatively bulky and occupy the same amount of space whether the equipment is in use or not in use. In addition, the lighting equipment must be activated and deactivated separately from the scanning equipment which creates a relatively complex operation. Sometimes the suppliers of the scanning equipment do not provide the lighting equipment which must be obtained by the owner/purchaser of the scanning equipment. Another shortcoming or problem with such prior art scanning and lighting equipment systems is that as the scanner is moved closer to or away from a document to be scanned the operator of the equipment must also adjust the position of the lights. This is a relatively tedious and time consuming task. Thus, there is a need in the prior art for a scanner/digitizer arrangement that includes an integral light arrangement for illuminating documents to be scanned. In addition, there is a need in the art for such an arrangement that does not need to be manually adjusted, energized and deenergized separate from the scanning equipment. Further, there is a need for such an arrangement that will occupy a relatively small amount of space when not in use, but is easily and quickly made ready for use in scanning and digitizing a document.

SUMMARY OF THE INVENTION

We solve the above enumerated shortcomings and needs of the prior art document scanning and digitizing equipment by providing lighting equipment that is an integral part of the scanning and digitizing equipment. A document scanner is attached to a horizotal arm member which is in turn attached to and movable up and down a vertical support member which in turn is attached to a tablet on which is placed a document to be scanned. The lighting equipment consists of two arms that are pivotally attached to the horizontal arm member and each arm has a light source attached to its outer non pivoting end. Each arm with a light (light arm) is normally folded against the horizontal arm member for convenient storage when the video scanning arrangement is not in use, and the light arms are extended to move the light sources away from the horizontal arm member and the scanner when the video scanning arrangement is to be used. This provides a scanner and lighting arrangement that is relatively small and compact when the scanning equipment is not in use and therefore stored in a relatively small amount of space, but is easily and quickly set up for scanning and digitizing a document. The light sources lies in a horizontal plane parallel to that of the scanner and are automatically energized to illuminate a document on the tablet when the scanner is actuated to scan a document. This eliminates the need to manually and separately position the lights apart from positioning the scanner prior to scanning a document.

DESCRIPTION OF THE DRAWING

Our invention will become more apparent on reading the following detailed description in conjunction with the drawing in which.

DETAILED DESCRIPTION

Figure 1:
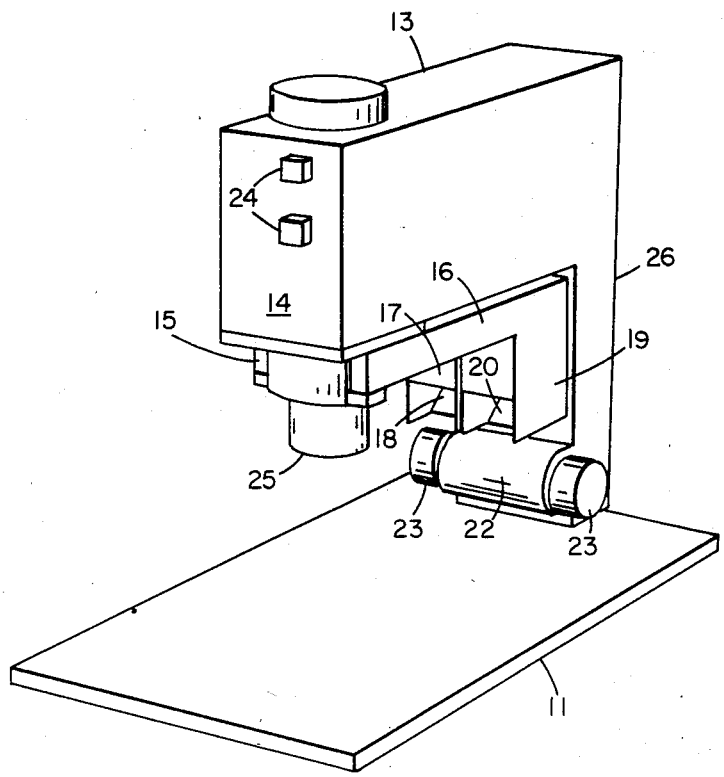
FIG. 1 shows our novel combined scanner and lighting arrangement with the arm mounted lights folded against the scanner support structure to thereby provide for easy and compact storage of the lights.

In FIG. 1 is shown our novel combined scanner and lighting arrangement 10 with the arm mounted lights folded against the scanner support structure to thereby provide for easy and compact storage. Scanner and lighting arrangement 10 will normally sit on a table top or other surface on which the scanner will be utilized. The support structure comprises a tablet 11 which is the base of scanner and lighting arrangement 10 and it sits on the table top or other surface and supports the rest of the elements making up the support elements, the scanner and the lights. Tablet 11 is the surface upon which a document is placed to be scanned and digitized in a manner well known in the art. A vertical support member 12 (not shown in FIG. 1, but shown in FIG. 2 and described further in this specification) is fastened to tablet 11. Vertical support member 12 need not be vertical to tablet 11 as shown, but may also be inclined at some angle to the vertical from tablet 11. Horizontal arm member 13 is hollow, is movably fastened to vertical support member 12 and is movable up and down vertical support member 12 for the purpose of adjusting the size of the area to be scanned by the scanner. In the preferred embodiment of our invention member 13 is basically horizontal to tablet 11, but need not be. It may be at an angle to tablet 11.

Figure 2:
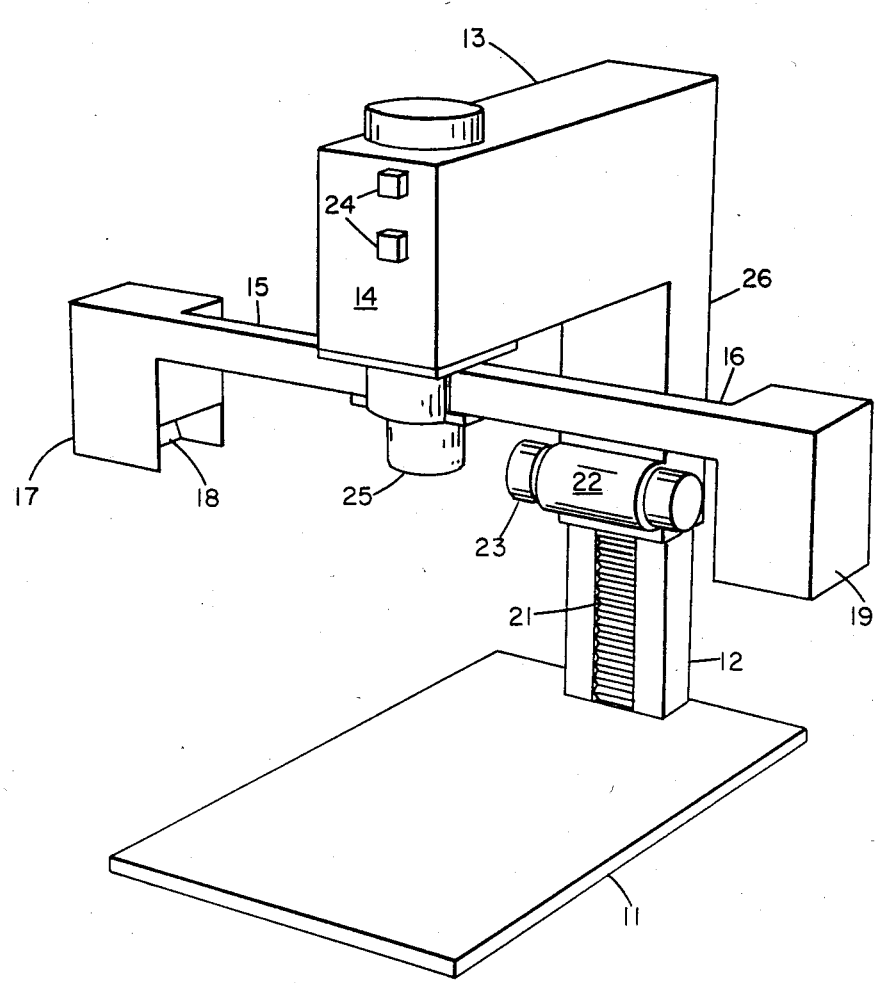
FIG. 2 shows our novel combined scanner and lighting arrangement with the arm mounted lights extended from the scanner support structure to thereby provide for convenient use of the lights.

Horizontal arm member 13 is "L" shaped and has a hollow vertical portion 26 which telescopically slides over vertical support member 12 as may be seen when comparing FIGS. 1 and 2. Vertical support member 12 has a series of equally spaced grooves 21 as seen in FIG. 2. Vertical portion 26 of horizontal arm member 13 has a mechanism 22 fastened to the bottom thereof used for telescoping members 12 and 13. Mechanism 22 has two knobs 23 which are both connected to mechanism 22 and function therewith when the knobs are manually operated to telescope hollow vertical portion 20 and vertical support member 12. The operation of knobs 23 rotate teeth (not shown) within mechanism 22 to ride in grooves 21 to perform the telescoping action. In FIG. 1 is shown horizontal support members 12 and 13 telescoped apart somewhat. The operator of scanner and lighting arrangement 10 adjusts knobs 23 to select the area of a document (not shown) on tablet 11 to be scanned. To scan a large area the operator turns knob 23 to move horizontal arm member 13 higher above tablet 11, and then operates lens 25 for focus. To scan a smaller area the operator turns knob 23 to move horizontal arm member 13 closer to tablet 11, and then operates lens 25 for focus.

A scanner/digitizer 14 is mounted inside the outer end of horizontal support member 13 furthest from vertical support member 12. Scanner/digitizer 14 is not specifically shown as it is mounted inside the outer end of horizontal arm member 13 which is hollow but scanner/digitizer 14 is well known in the art so is not described in detail herein. Scanner 14 is only seen in FIGS. 1 and 2 by lens 25, and controls 24. Lens 25 on the bottom of scanner 14 focuses the image of a document (not shown) on tablet 11 onto a charge coupled device (CCD) array (not shown) within scanner/digitizer 14. During scanning the CCD array is physically moved within arm member 13 so as to move it across the image plane of lens 25 and the CCD elements are then periodically scanned to sense a series of analog levels from the CCD elements which analog levels are digitized thereby generating a digital signal representing the document (not shown) on tablet 11 that has been scanned. The CCD array and the electromechanical and electronic circuitry associated with the scanning and digitizing function just described are all located in scanner 14 inside the outer end of horizontal arm member 13.

In FIGS. 1 and 2 can also be seen two light arms 15 and 16 that are pivotally attached to horizontal arm member 13 at their ends that are furthest from vertical support member 12. FIG. 1 shows light arms 15 and 16 folded against horizontal arm member 13, while FIG. 2 shows light arm members 15 and 16 extended for illuminating a document (not shown) on tablet 11 to be scanned. On the end of arm 15 opposite its pivoting end is a light (not shown) inside a housing 17 which also has a reflector 18 therein for properly reflecting the light generated by the light inside housing 17 onto tablet 11. On the end of arm 16 opposite its pivoting end is also a light (not shown) in a housing 19 which also has a reflector 20 therein for properly reflecting the light generated by the light inside housing 19 onto tablet 11. Housings 17 and 19 serve the purpose of blocking stray light from the lamps therein (not shown) while using reflectors 18 and 20 which are mounted in these housings to reflect the light generated by the lamps onto the middle area of tablet 11 where a document is placed to be scanned. Hereinafter, arms 15 and 16 are called light arms. The wiring for each of the lamps (not shown) inside housings 17 and 19 is within the respective one of light arms 15 and 16 and is routed to scanner 14 which is inside the hollow end of horizontal arm member 13 from where all the lights are controlled to illuminate a document on tablet 11 when the document is being scanned. When scanner and lighting arrangement 10 is not in use light arms 15 and 16 easily and quickly fold up against horizontal arm member 13, as shown in FIG. 1, in a compact manner so that scanner and lighting arrangement 10 takes up a minimal amount of space.

In FIG. 2 light arms 15 and 16 are shown pivotally extended. The operator of scanner and lighting arrangement 10 extends light arms 15 and 16 when it is desired to use the scanner. With this configuration, the lamps in housings 17 and 19 are advantageously substantially the same distance away from a document (not shown) on tablet 11 and can never be closer to the document than scanner 14. In this manner light generated by the lamps inside housings 17 and 19 on the outer ends of light arms 15 and 26 respectively can never directly enter lens 25 and thereby interfere with the operation of the scanner. Further, as horizontal support member 13 is adjusted for height, light arms 15 and 16 are simultaneously adjusted for height. On the front scanner 14 facing the operator are controls 24 for operating scanner 14. One of the controls 24, a target control, is used in conjunction with manually vertically adjusting scanner 14 for focus and locating the document site area to be scanned as described in copending U.S. patent application Ser. No. 489,642, filed Apr. 28, 1983, entitled Scanner Document Positioning Device, filed in the names of An Wang and Burton McConchie, and assigned to the same assignee as this patent application. This patent application is incorporated herein by reference.

Briefly, the last mentioned one of controls 24 is operated by the operator and in response thereto a projection lamp (not shown) inside scanner 14 is energized for a brief time, such as thirty seconds, by timer circuitry which is a part of scanner 14. During this brief time the energized projection lamp is energized an image indicating the site area to subsequently be scanned by scanner 14 is projected onto tablet 11. A document to be scanned is placed on tablet 11 so that the site image is projected onto the portion of the document desired to be scanned and digitized. If a larger area is to be scanned, knobs 23 are turned to raise horizontal support member 13 higher above tablet 11 and, in a manner well known in the art, the site image becomes larger. Then lens 25 is then rotated by the operator to sharply focus the site image. By sharply adjusting the focus of the projected site image, it is guaranteed that the image of the illuminated document on tablet 11 is focussed by lens 25 onto the CCD array (not shown) in scanner 14 inside horizontal support member 13. Conversely, when it is desired to scan a smaller area of a document on tablet 11, knobs 23 are turned to lower horizontal support member 13 closer to tablet 11 and, in a manner well known in the art, the site image becomes smaller. Then lens 25 is then rotated by the operator to sharply focus the site image. At the end of the short time for adjusting the height of horizontal support member 13 and lens 25, the timer circuitry within scanner 14 times out and extinguishes the projection lamp (not shown) inside horizontal support member 13.

After the site area for scanning of the document (not shown) on tablet 11 has been adjusted and lens 25 adjusted for focus, scanner and lighting arrangement 10 is ready to scan and digitize the document. The operater operates a Scan control 24 on the front of horizontal arm member 13 which thereby places the equipment in its scan and digitize mode. In response to the operation of Scan control 24 the electronic circuitry (not shown) of scanner 14 inside horizontal arm member 13 automatically energizes illumination lamps 17 and 19 on the ends of light arms 15 and 16, and other electronic circuitry is enabled to scan and digitize the document as it is known in the art. At the end of scanning and digitizing the document lamps 17 and 19 are automatically extinguished by the circuitry of scanner 14.

To store scanning and lighting arrangement 10, light arms 15 and 16 are pivotally folded against horizontal arm member 13 as shown in FIG. 1. Knobs 23 may be rotated to lower horizontal support member 13 to its lowest position, as shown in FIG. 1, for more compact storage but this is not absolutely necessary.

While what has been described hereinabove is the preferred embodiment of our invention, it will be apparent to those skilled in the art that numerous changes and modifications may be made thereto without departing from the spirit and scope of the invention. For example, the scanner does not have to be enclosed within the horizontal support member, and the light arms may pivot on the scanner rather than the horizontal support member.

What we claim is:

1. A video scanning arrangement for scanning and digitizing documents having alphanumeric and/or other image information thereon, and comprising:
   a tablet on which a document to be scanned and digitized is placed,
   a support member having a first end attached to said tablet,
   an arm member having a first end movably attached to said support member so that said arm member can move along said support member to be at varying distances from said tablet,
   a scanner attached to a second end of said arm member, said scanner being actuable to scan a document on said tablet for the creation of a digital representation of said document,
   at least one light arm, with each light arm having a first end pivotally attached to said arm member, and
   a light source attached to each light arm, with each light arm normally being folded against said arm member for storage when said video scanning arrangement is not in use, and each light arm being extendable from said arm member when said video scanning arrangement is in use to move said light source thereon pivotally outward to a fixed position relative to the scanner, to provide uniform illumination of said document.

2. The invention in accordance with claim 1 wherein said arm member has a hollow portion substantially at a right angle thereto, said hollow portion fitting over the top of said support member and telescoping therewith to move the scanner on the end of said arm member closer to or further away from a document to be scanned.

3. The invention in accordance with claim 1 wherein said arm member has a hollow portion substantially at a right angle thereto, said hollow portion fitting over the top of said support member and telescoping therewith to move the scanner on the end of said arm member closer to or further away from a document to be scanned, and further comprising a mechanism attached to the hollow end of said arm member and actuable to telescope said arm member from said support member so that said arm member can move along said support member to move said scanner to be at varying distances from the document.

4. The invention in accordance with claim 1, further including means for energizing said light source to illuminate said document upon actuation of said scanner for scanning said document and means for extinguishing said light source upon completion of said scanning.

5. A video scanning arrangement for scanning and digitizing documents on a mounting surface and the documents have alphanumeric and/or other image information thereon, and comprising:
   a support member attachable to said mounting surface,
   an arm member having a first end movably attached to said support member so that said arm member can move along said support member to be at varying distances from a document on said mounting surface,
   a scanner attached to a second end of said arm member, said scanner being actuable to scan a document on said mounting surface for the creation of a digital representation of said document,
   at least one light arm with each light arm having two ends, with a first end of each light arm being pivotally attached to said arm member, with each said light arm normally being folded against said arm member for storage when said video scanning arrangement is not in use, and
   a light source attached to the second end of each light arm, each light arm being extendable when said video scanning arrangement is in use to move said light source thereon pivotally outward to a fixed position relative to the scanner, to provide uniform illumination of said document.

6. A lighting and scanner arrangement for scanning and digitizing documents having alphanumeric and/or other image information thereon comprising:
   a tablet on which a document to be scanned and digitized is place,
   a support member having a first end attached to said tablet,
   an arm member having a first end movably attached to said support member so that said arm member can move along said support member to be at varying distances from said tablet,
   a scanner attached to a second end of said arm member, said scanner being actuable to scan a document on said tablet for the creation of a digital representation of said document,
   at least one light arm, with each light arm having a first end pivotally attached to said scanner, and
   a light source attached to each light arm, with each light arm normally being folded against said arm member for storage when said video scanning arrangement is not in use, and each light arm being extendable from said arm member when said video scanning arrangement is in use to move said light source thereon pivotally outward to a fixed position relative to the scanner, to provide uniform illumination of said document.

7. The invention in accordance with claim 6 wherein said arm member has a hollow portion substantially at a right angle thereto, said hollow portion fitting over the top of said support member and telescoping therewith to move the scanner on the end of said arm member closer to or further away from a document to be scanned.

8. The invention in accordance with claim 6 wherein said arm member has a hollow portion substantially at a right angle thereto, said hollow portion fitting over the top of said support member and telescoping therewith to move the scanner on the end of said arm member closer to or further away from a document to be scanned, and further comprising a mechanism attached to the hollow end of said arm member and actuable to telescope said arm member from said support member so that said arm member can move along said support member to move said scanner to be at varying distances from the document.

9. The invention in accordance with claim 6, further including means for energizing said light source to illuminate said document upon actuation of said scanner for scanning said document and means for extinguishing said light source upon completion of said scanning.

10. A lighting and scanner arrangement for scanning and digitizing documents placed on a mounting surface, said document having alphanumeric and/or other image information thereon comprising:

a support member attachable to a mounting surface, an arm member having a first end movably attached to said support member so that said arm member can move along said support member to be at varying distances from the document on said mounting surface, a scanner attached to a second end of said arm member, said scanner being actuable to scan a document on said mounting surface for the creation of a digital representation of said document, at least one light arm, with each light arm having two ends with a first end pivotally attached to said scanner, with each light arm normally being folded against said arm for storage when said video scanning arrangement is not in use, and a light source attached to a second end of each light arm, each light arm being extendable when said video scanning arrangement is in use to move said light source thereon pivotally outward to a fixed position relative to the scanner, to provide uniform illumination of said document.

11. A video scanning arrangement for scanning and digitizing documents having alpha numeric and/or other image information thereon comprising:

a scanner being actuable to scan a document for the creation of a digital representation of said document, said scanner being movable to adjust the focus of the scanner and the area of a document to be scanned, at least one light arm, with each light arm having two ends with a first end pivotally attached to and movable with said scanner, with each said light arm normally being folded against said scanner for storage when said video scanning arrangement is not in use to thereby make a compact package, and a light source attached to a second end of each light arm, each light arm being extendable when said video scanning arrangement is in use to move said light source thereon pivotally outward to a fixed position relative to the scanner, to provide uniform illumination of said document.

12. The invention in accordance with claim 11 wherein said arm member has a hollow portion substantially at a right angle thereto, said hollow portion fitting over the top of said support member and telescoping therewith to move the scanner on the end of said arm member closer to or further away from a document to be scanned.

13. The invention in accordance with claim 11 wherein said arm member has a hollow portion substantially at a right angle thereto, said hollow portion fitting over the top of said support member and telescoping therewith to move the scanner on the end of said arm member closer to or further away from a document to be scanned, and further comprising a mechanism attached to the hollow end of said arm member and actuable to telescope said arm member from said support member so that said arm member can move along said support member to move said scanner to be at varying distances from the document.

14. The invention in accordance with claim 11, further including means for energizing said light source to illuminate said document upon acuation of said scanner for scanning said document and means for extinguishing said light source upon completion of said scanning.

* * * * *